United States Patent
Contrucci et al.

Patent Number: 5,149,363
Date of Patent: Sep. 22, 1992

[54] PROCESS FOR SMELTING OR MELTING FERROUS OR NON-FERROUS METAL FROM SELF-REDUCING AGGLOMERATES OR METAL

[76] Inventors: Marcos A. Contrucci, Caminho Do Sertao s/n°, Alto Da Boa Vista, Rio de Janeiro; Henrique P. Rizzo, Rua Thomaz Carvalhal, 855 Apto. 12, Paraiso, Sao Paulo; Herbert Schwarz, Rua Jaragua, 295 Joinville; Pedro H. C. Costa, Rua Joao Theiss, 72 Joinville; Enrique L. Gonzales, Rua Raul Pompeia, 131 Apto. 107, Copacabana, Rio de Janeiro; Pedro V. Duran, Rua Austergildo De Menezes, 104 Joinville; Norberto Jacomini, Rua Assis Brazil, 160 Joinville; Adalberto B. de Souza Santos, Rua Parana, 290 7° Andar Apto., 701 Joinville, all of Brazil

[21] Appl. No.: 293,697

[22] Filed: Jan. 5, 1989

Related U.S. Application Data

[63] Continuation-in-part of Ser. No. 167,143, filed as PCT/BR86/00020, Oct. 28, 1986, abandoned.

[30] Foreign Application Priority Data

Oct. 13, 1986 [BR] Brazil .............................. PI8605001

[51] Int. Cl.$^5$ ............................ C22B 5/00; C22B 9/16
[52] U.S. Cl. ........................................ 75/414; 75/499; 75/576; 75/707
[58] Field of Search .................. 75/40, 499, 517, 516, 75/576, 707, 414, 523; 266/155, 177, 218, 900

[56] References Cited

U.S. PATENT DOCUMENTS

| | | | |
|---|---|---|---|
| 2,167,596 | 7/1939 | Vial | 266/155 |
| 3,186,830 | 6/1965 | Moore et al. | 75/40 |
| 4,111,687 | 9/1978 | Syska | 75/499 |
| 4,564,389 | 1/1986 | Yamaoka et al. | 75/38 |
| 4,874,427 | 10/1989 | Hamada et al. | 75/499 |

Primary Examiner—Melvyn J. Andrews
Attorney, Agent, or Firm—Ladas & Parry

[57] ABSTRACT

Process and apparatus for producing ferrous or non-ferrous metals from a charge formed by self-reducing agglomerates (comprising pulverized ores, carbonaceous material plus a binder) consisting the apparatus of a shaft furnace, comprising a cylindrical or conical shaft (3), having, at the top portion thereof, loading gates or devices (1) and an outlet for gases through a chimney (19) or a chamber leading the same to heat regenerators (9) to pre-heat blown-in air and also having one or more rows of tuyeres (15) for blowing air; and a cylindrical or conical hearth (5) having a diameter greater than that of shaft (3) by an amount sufficient for positioning fuel feeders (4) directly over a fuel bed; and on the lower part, one or more rows of tuyeres (13) distributed so as to blow air oxygen enriched or not and injecting or not liquid gaseous, or pulverized fuels, this same apparatus being capable of melting 100% metallic charges of any metal and alloys or different proportions of metallic forms and self-reducing agglomerates.

16 Claims, 1 Drawing Sheet

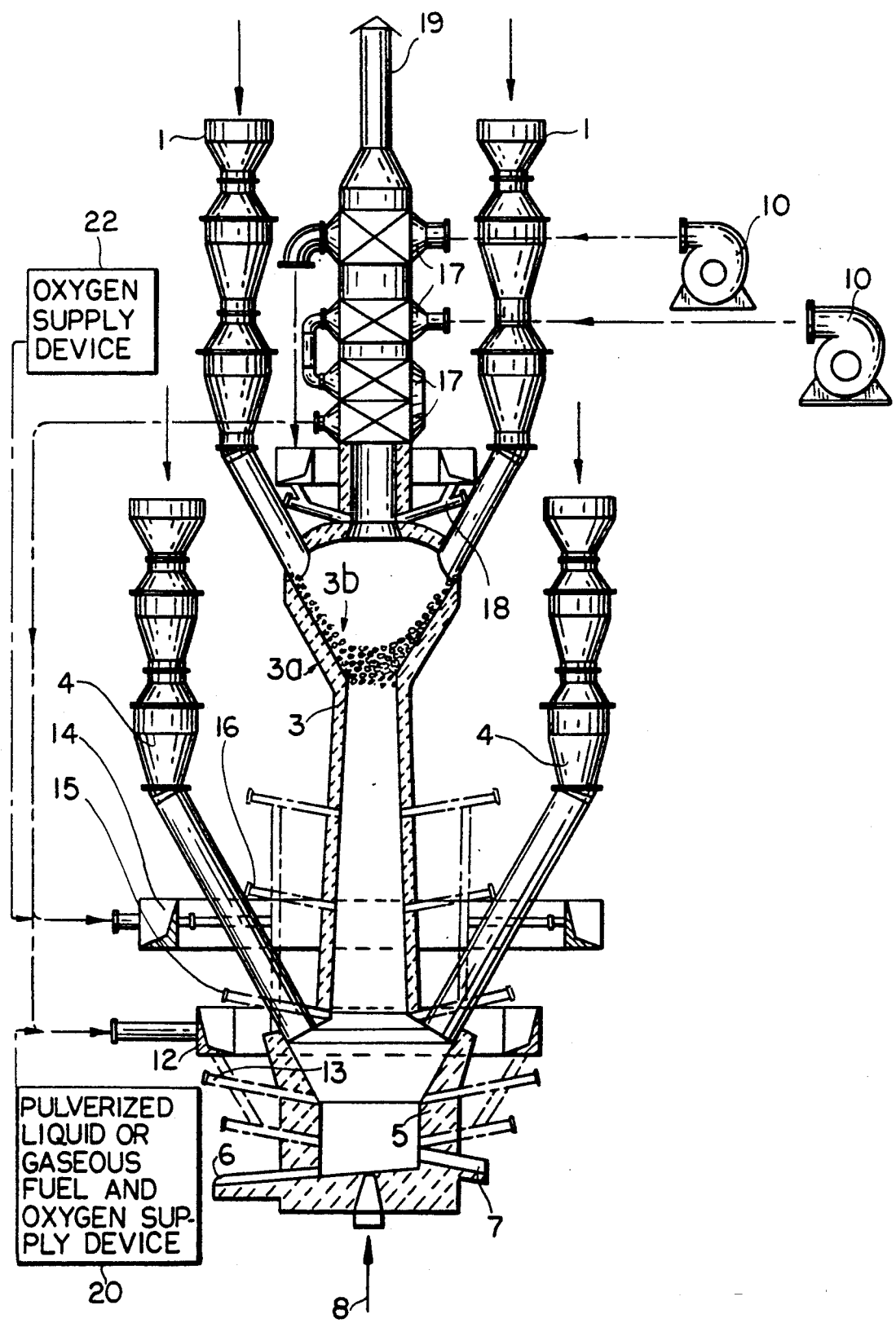

PROCESS FOR SMELTING OR MELTING FERROUS OR NON-FERROUS METAL FROM SELF-REDUCING AGGLOMERATES OR METAL

This is a continuation-in-part of application Ser. No. 167,143, filed on Dec. 4, 1987, now abandoned, and International application PCT/BR86/00020, filed on Oct. 28, 1986 and which designated the U.S.

BACKGROUND OF THE INVENTION

The invention relates to a novel metallurgical process and apparatus for smelting or melting ferrous or other metal self-reducing agglomerate or metals.

In a conventional blast-furnace, a burden, comprising sized lump-ore, pellets, sinter and/or other classical agglomerates plus coke and limestone, is charged into the top of the furnace to form a continuously moving column or charge (i.e., a moving-bed). Atmospheric air, preheated in Cowpers up to 1200° C., is blown through a row of tuyeres at the upper coke-filled portion of a furnace hearth to produce combustion and a reducing atmosphere due to the carbon monoxide formed by reaction of the air with carbon from the coke. This CO combines with oxygen from the iron oxide of the burden to reduce the oxides to metallic iron that then melts down and carbon saturates at the hearth, so as to produce pig iron.

The impurities, namely ore's gangue and coke ashes, form a less dense liquid slag floating over the surface of the molten pig iron.

The gases which flow countercurrently pre-heat and reduce the burden and leave the furnace through the top. These gases comprise mainly, CO, $CO_2$, $N_2$ and $H_2O$ and are used at the Cowpers to preheat combustion air to the furnace and to other heating purposes within the plant.

The reduction is, therefore, carried out through CO generated from partial combustion of the coke. CO diffuses into the metal-bearing particles and a reduction, following the reaction $MeO+CO \rightarrow Me+CO_2$, takes place. The $CO_2$ generated in this reaction then reacts into CO. These reactions require time and, thus, the need for a high residence time in order to attain high metallization of the charge. In typical blast-furnace operation, this residence time usually reaches 6 to 8 hours for a burden of agglomerates (pellets or sinter) or to 10 to 12 hours for a burden of sized lump ore.

Self-reducing agglomerates, which can be produced by currently known methods, present conditions much more favourable to reduction. A more intimate contact between the ore's oxides and finely divided charcoal or coal provide a lower reaction time since the time needed, in classical processes, for diffusion of CO from the furnace's atmosphere into the particles is not required because the reduction takes place rapidly inside the particles, again by the reactions:

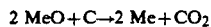

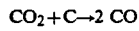

Unfortunately, in blast, cupola or other existing furnaces, the coke or other solid fuel is charged by the top to travel down and mix with, or settle over, the rest of the burden and, so, becomes exposed to and reacts countercurrently with the ascending $CO_2$, following the reaction $CO_2+C \rightarrow 2CO$. This effect, known as "solution loss" according to the Boudouard principle, takes place on hot carbonaceous particle's surface. It counteracts $CO_2$ formation within the furnace's atmosphere resulting in higher CO content of off-gases and, hence, in a higher consumption of coke, without any effective gain or advantage for the process. It prevents, in other words, reaching high $CO_2/CO$ rates of top gases of blast, cupola, or other furnaces either when smelting ores or even when using self-reducing agglomerates.

SUMMARY OF THE INVENTION

This invention departed from these conclusions to design a process encompassing a novel shaft furnace (self-reduction furnace) embodying innovations capable of rendering feasible the use of low priced solid fuels, such as low-quality coke, semi-coke, charcoal, biomasses, coal, etc. and the at least substantially non-reducing, full burning of these fuels to $CO_2$ and $H_2O$ within the furnace for attaining high energy efficiencies in a process, as well as combustion of that CO produced at the interior of self-reducing agglomerates, if these are the burden. The process and shaft furnace are also for, however, the simple melting of a metal burden to obtain liquid metal.

BRIEF DESCRIPTION OF THE DRAWING

FIG. 1 is a schematic elevational view of the shaft furnace of the present invention, partly in section.

DESCRIPTION OF EMBODIMENTS

This novel furnace and smelting process comprises, basically, a longitudinally hollow shaft 3 having a longitudinally top portion at 3a for receiving a burden at 3b of self-reducing agglomerates (or in another, melting process, metal) from loading gates 1. The loading gates can be a double-bell system, as shown, or the like. An outlet for the up-coming gases, which in this furnace consist mainly of $CO_2$, $N_2$, and small amounts of unburnt CO, extends upwardly form the top portion of 3a. This lean top gas is after burnt in an off-gas after burner 18 having air pre-heaters 17 to pre-heat air from coalblast blowers 10 that is to be injected into the furnace and a chimney 19.

For this, the shaft 3 that is charged only with the self-reducing agglomerates has an austle pipe 14 and several rows to tuyeres 15, 16 that let the blown, preheated air into the shaft where it burns carbon monoxide resulting from reduction reactions within the self-reducing agglomerates to provide most of the heat for the process. One of the peculiarities of this invention consists, then, in separating, totally, the burden of smeltable agglomerates, which is charged through the top of the furnace's shaft, from the charge of solid fuel (coke or other as mentioned), which is fed directly into a hearth 5 at the bottom of the furnace's shaft. This prevents any possible reconversions of $CO_2$ to CO by the Boudouard endothermic reaction over hot-coke or other solid-fuel particles in the burden, as happens in blast and cupola furnaces.

The hearth 5 is cylindrically or, as in this embodiment, conically shaped with the diameter of its upper portion at the shaft 3 being greater than that of the shaft 3 by an amount sufficient for admitting feeders 4 for the coke, charcoal, coal or other solid fuel. These feeders are distributed around the hearth sufficiently for promoting a feed of the fuel suitable to make a bed in the hearth.

The hearth 5 also has an austle pipe 12 and one or, as in this embodiment, more rows of tuyeres 13 distributed so as to provide the blown, pre-heated air to burn the fuel bed. $O_2$ enrichment and injection of liquid, gaseous or pulverized fuels through the tuyeres can also be accomplished with device 20, if desired. Total combustion of the fuel fed to the furnace, and combustion of additional means to gauge the temperature profile of the furnace, too.

Since the burden charged into the shaft 3 does not include coke, charcoal or any other solid fuel, the reaction $CO_2+C\rightarrow 2CO$, which is endothermic and consumes considerable amounts of carbon, does not take place. As a result, the following consumption rates can be reached with this process in comparison to existing processes.

| | | PER TON OF PIG IRON | |
|---|---|---|---|
| BLAST FURNACE | | YAMAOKA'S (MELTING GASIFIER) | PRESENT INVENTION SELF REDUCING FURNACE |
| COKE | 500 kg | — | — |
| LOW QUALITY COKE | — | 216 kg | 90 kg |
| COAL | — | 36 kg | — |
| PULVERIZED COAL | — | 336 kg | 210 kg (1) |
| OXYGEN | — | 336 $Nm^3$ | — |
| STEAM | — | 12 kg | — |
| LIMESTONE | 90 kg | 52 kg | 40 kg |
| BY-PRODUCT GAS | 1.25 $Nm^3$ (2) | 940 $Nm^2$ (3) | — |
| ACTUAL ENERGY CONSUMED | 2.800 Mcal | 3.140 Mcal | 1.950 Mcal |

(1) Charcoal fines or any other fine carbonaceous material inside the self-reducing agglomerates.
(2) 960 $Kcal/Nm^3$
(3) 1.664 $Kcal/Nm^3$ CO resulting from reduction reactions in the self-reducing agglomerates, provide the thermal energy required for smelting the burden.

The temperature profile of the process and the descend speed of the burden are gauged by the air injection rates at the various tuyere rows. The high speed of reaction of self-reducing agglomerates results, however, in high rates of material flow through the shaft, thus leading to extremely reduced dimensions per output quantity for furnaces in comparison to blast and other shaft furnaces of the present art and lower investment rates per unit of production.

Molten metal and slag from the burden flow down the shaft to the hearth where metal is carbureted to desired levels and then flows continuously, as in this embodiment, or discontinuously, as preferred, out the apparatus through pouring spouts 6, 7, respectively, which positioned in the lower portion of the hearth so as to ensure proper separation between the metal and slag.

In this process, it shall be stressed again, solid fuel is not added to the burden charged into shaft top as in the conventional processes but, rather, it is separated from the smelting burden, being fed only right into the hearth over the fuel bed at the shaft 3. This charging procedure, added to the fact that reducing carbonaceous material is present at the cores of the self-reducing agglomerates, eliminates the need for a reducing atmosphere inside the furnace and allows the solid fuel charged into the hearth's bed (as well as liquid, gaseous or pulverized fuels that may be fed through the tuyeres) and also the CO resulting from the reducing reactions within the cores of the agglomerates to be almost totally burnt to $CO_2+N_2$ within the furnace, hence reducing sharply the fuel needed for the process. The residual amount of CO in the off-gases at the top of the shaft is converted into sensible heat, moreover, to pre-heat incoming air in recuperators (air pre-heaters 17), so that this heat is also recycled to the process to save fuel.

If desired, the blown-in air can be oxygen enriched with device 22, as described above. This provides an The process and apparatus of the present invention also allows a great flexibility in operation, whereby another use of the present invention is for merely melting any metal, alloy, or scrap or pig iron, as presently done in cupola furnaces. Again, because no coke or any other fuel is added to the burden in the shaft, there is an appreciable decrease in fuel consumption, since no loss of carbon by reaction with $CO_2$ from the flowing gases occurs. In this version, the process will use 65 Kg of coke per ton of iron melted, which is barely half of the prevailing figures of existing cupolas.

Both processes have advantages over cupola, blast and other types of shaft furnaces, therefore, in addition to providing large fuel savings for smelting self-reducing agglomerates by using the low cost solid reductants, such as non-coking coals or charcoal fines, insider the agglomerates themselves. Low priced solid fuels, such as semi-coke, low-quality coke, bio-masses and the like, as well as injected fuels such as natural gas and pulverized coals can be used. Further, more fuel is saved by fully burning whatever solid fuel is used, and the CO gases from inside the agglomerates when smelting, these. Furthermore still more fuel is saved by burning the remaining CO of the off-gases in the recuperators at the top of the furnace's shaft to pre-heat blown-in air.

We claim:

1. A process for melting metal, comprising:
providing longitudinally hollow shaft having a top at one longitudinal end and a bottom at an opposite longitudinal end;
receiving a burden of only metal in burden-receiving means in the shaft between the top and bottom of the shaft;
feeding solid fuel into a hearth at the bottom of the shaft;
burning at least the solid fuel in the hearth for producing hot combustion gases including CO that rise in the shaft from the bottom of the shaft toward the top of the shaft, whereby to heat the burden;
providing at least air to the hearth for the burning in the hearth with first tuyere means;

providing sufficient air with second tuyere means to the hot combustion gases rising in the shaft to the burden-receiving means that an atmosphere in the burden-receiving means is at least substantially non-reducing means, whereby at least most of the CO combustion gas from the hearth burns for additionally heating and melting the burden into molten metal and slag;

receiving hot gases from the shaft in chimney means at the top of the shaft; and removing from the hearth the molten metal and slag that run down the shaft and into the hearth from the burden.

2. The process for melting metal of claim 1, and further comprising providing at least one of pulverized, liquid and gaseous fuel and oxygen with the air to the hearth.

3. The process for melting metal of claim 1, and further comprising pre-heating the air provided by at least one of the first and second tuyere means with the hot gases received by the chimney means.

4. The process for melting metal of claim 2, and further comprising pre-heating the air provided by at least one of the first and second tuyere means with the hot gases received by the chimney means.

5. The process for melting metal of claim 1, providing oxygen to the air provided by the second tuyere means to the hot combustion gases rising in the shaft.

6. The process for melting metal of claim 2, providing oxygen to the air provided by the second tuyere means to the hot combustion gases rising in the shaft.

7. The process for melting metal of claim 3, providing oxygen to the air provided by the second tuyere means to the hot combustion gases rising in the shaft;

8. The process for melting metal of claim 4, providing oxygen to the air provided by the second tuyere means to the hot combustion gases rising in the shaft.

9. A process for smelting self-reducing agglomerates, comprising:

providing longitudinally hollow shaft having a top at one longitudinal end and a bottom at an opposite longitudinal end;

receiving a burden of only self-reducing agglomerates in burden-receiving means in the shaft between the top and bottom of the shaft;

feeding solid fuel into a hearth at the bottom of the shaft;

burning at least the solid fuel in the hearth for producing hot combustion gases including CO that rise in the shaft from the bottom of the shaft toward the top of the shaft, whereby to heat the burden;

providing at least air to the hearth for the burning in the hearth with first tuyere means;

providing sufficient air with second tuyere means to the hot combustion gases rising in the shaft to the burden-receiving means that an atmosphere in the burden-receiving means is at least substantially non-reducing, whereby at least most of the CO combustion gas from the hearth burns for additionally heating and smelting the burden into molten metal and slag;

receiving hot gases from the shaft in chimney means at the top of the shaft; and removing from the hearth the molten metal and slag that run down the shaft and into the hearth from the burden.

10. The process for smelting self-reducing agglomerates of claim 1, and further comprising providing at least one of pulverized, liquid and gaseous fuel and oxygen with the air to the hearth.

11. The process for smelting self-reducing agglomerates of claim 1, and further comprising pre-heating the air provided by at least one of the first and second tuyere means with the hot gases received by the chimney means.

12. The process for smelting self-reducing agglomerates of claim 2, and further comprising pre-heating the air provided by at least one of the first and second tuyere means with the hot gases received by the chimney means.

13. The process for smelting self-reducing agglomerates of claim 1, providing oxygen to the air provided by the second tuyere means to the hot combustion gases rising in the shaft.

14. The process for smelting self-reducing agglomerates of claim 2, providing oxygen to the air provided by the second tuyere means to the hot combustion gases rising in the shaft.

15. The process for smelting self-reducing agglomerates of claim 3, providing oxygen to the air provided by the second tuyere means to the hot combustion gases rising in the shaft.

16. The process for smelting self-reducing agglomerates of claim 4, providing oxygen to the air provided by the second tuyere means to the hot combustion gases rising in the shaft.

* * * * *

UNITED STATES PATENT AND TRADEMARK OFFICE
CERTIFICATE OF CORRECTION

PATENT NO. : 5,149,363
DATED : September 22, 1992
INVENTOR(S) : Marco A. Contrucci, ET. AL.

It is certified that error appears in the above-identified patent and that said Letters Patent is hereby corrected as shown below:

On Title page, add item -- [73] Assignee:
Tupy Tecnologia De Auto-Reducao Technored Ltda --
Santa Catarina, Brazil.

Signed and Sealed this

Twenty-third Day of November, 1993

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,149,363
DATED : Sept. 22, 1992
INVENTOR(S) : Marco A. Contrucci, et al It is certified that error appears in the above-indentified patent and that said Letters Patent is hereby corrected as shown below:

On title page, add item [73] Assignee:

--Tupy Tecnologia De Auto-Reducao Technored Ltda, Santa Catarina,

Brazil.--

This certificate supersedes Certificate of Correction issued November 23, 1993.

Signed and Sealed this

Fifth Day of July, 1994

*Attest:*

BRUCE LEHMAN

*Attesting Officer*     *Commissioner of Patents and Trademarks*